US009573492B2

(12) United States Patent
Linnenbrink et al.

(10) Patent No.: US 9,573,492 B2
(45) Date of Patent: Feb. 21, 2017

(54) VEHICLE SEAT

(71) Applicant: Johnson Controls Technology Company, Holland, MI (US)

(72) Inventors: Jorg Linnenbrink, Wuppertal (DE); Ingo Kienke, Wermelskirchen (DE); Ulrich Riedel, Kuerten (DE)

(73) Assignee: Johnson Controls Technolgy Company, Holland, MI (US)

( * ) Notice: Subject to any disclaimer, the term of this patent is extended or adjusted under 35 U.S.C. 154(b) by 0 days.

(21) Appl. No.: 14/399,007

(22) PCT Filed: May 7, 2013

(86) PCT No.: PCT/US2013/039856
§ 371 (c)(1),
(2) Date: Nov. 25, 2014

(87) PCT Pub. No.: WO2013/169715
PCT Pub. Date: Nov. 14, 2013

(65) Prior Publication Data
US 2015/0108805 A1    Apr. 23, 2015

Related U.S. Application Data

(60) Provisional application No. 61/643,587, filed on May 7, 2012.

(51) Int. Cl.
*B60N 2/16* (2006.01)
*B60N 2/18* (2006.01)
(Continued)

(52) U.S. Cl.
CPC ........... *B60N 2/1842* (2013.01); *B60N 2/449* (2013.01); *B60N 2/546* (2013.01); *B60N 2/686* (2013.01); *B60N 2/7094* (2013.01)

(58) Field of Classification Search
CPC .......... B60N 2/16; B60N 2/64; B60N 2/1842; B60N 2/546; B60N 2/686; B60N 2/7094; B60N 2/449
(Continued)

(56) References Cited

U.S. PATENT DOCUMENTS 3,220,767 A * 11/1965 Hendrickson .......... A47C 7/021
297/228.12
3,695,696 A * 10/1972 Lohr ...................... B60N 2/686
24/647
(Continued)

FOREIGN PATENT DOCUMENTS

DE          893854 C     10/1953
DE        2152104 A1     4/1973
(Continued)

OTHER PUBLICATIONS

International Preliminary Report on Patentability for Application No. PCT/US2013/039856; dated Nov. 20, 2014.
(Continued)

*Primary Examiner* — Beth Stephan
(74) *Attorney, Agent, or Firm* — The Dobrusin Law Firm, P.C.

(57) ABSTRACT

Vehicle seat (1) having a seat part (2) and a backrest (3), wherein the supporting structure (44) of the seat part or the backrest, in particular the side part thereof, integrally has at least one spring element (40, 31) a pivot point (P) and/or a safety belt connection.

11 Claims, 3 Drawing Sheets

(51) Int. Cl.
*B60N 2/54* (2006.01)
*B60N 2/68* (2006.01)
*B60N 2/70* (2006.01)
*B60N 2/44* (2006.01)

(58) Field of Classification Search
USPC ......... 297/337, 340, 452.14, 452.55, 452.15, 297/344.13, 344.15
See application file for complete search history.

(56) References Cited

U.S. PATENT DOCUMENTS

| | | | |
|---|---|---|---|
| 3,759,587 A | | 9/1973 | Christin |
| 3,874,727 A * | | 4/1975 | Mehnert ................ A47C 1/033 297/320 |
| 3,877,750 A * | | 4/1975 | Scholpp ................ A47C 1/143 297/284.3 |
| 4,379,589 A * | | 4/1983 | Marino .................. A47C 7/448 248/621 |
| 4,451,085 A * | | 5/1984 | Franck ............... A47C 1/03255 297/285 |
| 4,502,730 A | | 3/1985 | Kazaoka et al. |
| 4,585,272 A * | | 4/1986 | Ballarini .................. A47C 3/12 297/284.3 |
| 4,647,109 A * | | 3/1987 | Christophersen ........ A47C 1/12 297/452.15 |
| 4,913,493 A * | | 4/1990 | Heidmann ............. A47C 7/448 297/285 |
| 4,995,669 A | | 2/1991 | Croft |
| 4,997,223 A | | 3/1991 | Croft |
| 5,067,772 A * | | 11/1991 | Koa ....................... A47C 7/185 297/229 |
| 5,154,476 A | | 10/1992 | Haider et al. |
| 5,163,735 A | | 11/1992 | Aljundi |
| 5,251,864 A | | 10/1993 | Itou |
| 5,320,410 A * | | 6/1994 | Faiks ..................... A47C 7/445 297/285 |
| 5,346,281 A | | 9/1994 | Hughes |
| 5,433,507 A | | 7/1995 | Chang |
| 5,466,048 A | | 11/1995 | Fowler et al. |
| 5,468,048 A | | 11/1995 | Clemens et al. |
| 5,577,811 A * | | 11/1996 | Ogg ......................... A47C 3/12 297/284.4 |
| 5,704,691 A * | | 1/1998 | Olson ..................... A47C 7/18 297/452.15 |
| 5,733,008 A | | 3/1998 | Tame |
| 5,934,753 A | | 8/1999 | Lange |
| 5,984,407 A | | 11/1999 | Ligon, Sr. et al. |
| 6,022,075 A * | | 2/2000 | Blocker ................... A47C 3/38 297/219.1 |
| 6,193,318 B1 * | | 2/2001 | Becker .................. B60N 2/686 297/452.15 |
| 6,341,819 B1 | | 1/2002 | Kojima et al. |
| 6,422,651 B1 | | 7/2002 | Mühlberger et al. |
| 6,520,581 B1 | | 2/2003 | Tame |
| 6,565,156 B1 | | 5/2003 | Yamashita et al. |
| 6,592,186 B1 | | 7/2003 | Mühlberger et al. |
| 6,609,753 B2 * | | 8/2003 | Schmidt-Schaeffer .. A47C 7/28 297/284.2 |
| 6,935,693 B2 | | 8/2005 | Janscha et al. |
| 6,955,399 B2 | | 10/2005 | Hong |
| 7,278,686 B2 | | 10/2007 | Yoshida |
| 7,740,316 B2 | | 6/2010 | Beneker et al. |
| 7,837,273 B1 * | | 11/2010 | Ratza ..................... B60N 2/24 297/452.49 |
| 7,926,879 B2 * | | 4/2011 | Schmitz ............. A47C 1/03255 297/340 |
| 7,959,229 B2 | | 6/2011 | Ishijima et al. |
| 8,162,404 B2 | | 4/2012 | Ueda |
| 8,333,530 B2 | | 12/2012 | Omori |
| 8,376,456 B2 | | 2/2013 | Fujita et al. |
| 8,480,152 B2 | | 7/2013 | Shimizu |
| 2002/0060487 A1 | | 5/2002 | Makosa |
| 2002/0089225 A1 | | 7/2002 | Bruck et al. |
| 2003/0006636 A1 | | 1/2003 | Ligon, Sr. et al. |
| 2003/0218368 A1 | | 11/2003 | Akaike et al. |
| 2004/0160099 A1 | | 8/2004 | Hong |
| 2005/0062326 A1 | | 3/2005 | Kim et al. |
| 2005/0179290 A1 | | 8/2005 | Hancock et al. |
| 2005/0285008 A1 | | 12/2005 | Beneker et al. |
| 2006/0055219 A1 | | 3/2006 | Heimann et al. |
| 2006/0152051 A1 | | 7/2006 | Colja et al. |
| 2006/0226683 A1 | | 10/2006 | Massara et al. |
| 2006/0244293 A1 | | 11/2006 | Buffa |
| 2007/0090263 A1 | | 4/2007 | Yamada et al. |
| 2007/0108816 A1 | | 5/2007 | McQueen et al. |
| 2009/0026811 A1 | | 1/2009 | Samain et al. |
| 2009/0096263 A1 | | 4/2009 | Samain et al. |
| 2009/0174241 A1 | | 7/2009 | Pattyn et al. |
| 2010/0026069 A1 | | 2/2010 | Bruck et al. |
| 2010/0026070 A1 | | 2/2010 | Rohee et al. |
| 2010/0096897 A1 | | 4/2010 | Kienke et al. |
| 2010/0117419 A1 * | | 5/2010 | Schmitz ............ A47C 1/03255 297/284.1 |
| 2010/0133732 A1 * | | 6/2010 | Yamaguchi ........... B60N 2/002 267/140.4 |
| 2010/0201173 A1 | | 8/2010 | Boes |
| 2011/0006581 A1 | | 1/2011 | Funk et al. |
| 2011/0042514 A1 * | | 2/2011 | Ehlers ................ B64D 11/0696 244/122 R |
| 2011/0042515 A1 | | 2/2011 | Schoke et al. |
| 2011/0115268 A1 | | 5/2011 | Maierhofer et al. |
| 2011/0127817 A1 | | 6/2011 | Yu et al. |
| 2011/0304188 A1 | | 12/2011 | Aktas |
| 2011/0316317 A1 | | 12/2011 | Sprenger et al. |
| 2012/0119555 A1 | | 5/2012 | Aktas |
| 2012/0133183 A1 | | 5/2012 | Kim et al. |
| 2012/0228911 A1 * | | 9/2012 | Piretti ....................... A47C 3/12 297/285 |
| 2013/0075571 A1 | | 3/2013 | Suck et al. |
| 2013/0248675 A1 | | 9/2013 | Ewald et al. |
| 2013/0313876 A1 | | 11/2013 | Perrin |
| 2013/0341982 A1 | | 12/2013 | Maierhofer et al. |
| 2014/0138996 A1 | | 5/2014 | Kramm et al. |
| 2015/0102199 A1 | | 4/2015 | Linnenbrink et al. |
| 2015/0108805 A1 | | 4/2015 | Linnenbrink et al. |
| 2015/0151653 A1 | | 6/2015 | Furuta |
| 2015/0203011 A1 | | 7/2015 | Fujita et al. |
| 2015/0314709 A1 | | 11/2015 | Kim et al. |

FOREIGN PATENT DOCUMENTS

| | | | |
|---|---|---|---|
| DE | 2723722 A1 * | 12/1978 | ............... A47C 5/12 |
| DE | 3937818 A1 | 5/1991 | |
| DE | 19639109 A1 | 3/1998 | |
| DE | 19961070 C1 | 4/2001 | |
| DE | 202006007862 U1 | 9/2007 | |
| DE | 102008039166 A1 * | 2/2010 | ............. B60N 2/015 |
| DE | 102009043298 A1 | 5/2011 | |
| DE | 102011106219 A1 | 1/2012 | |
| EP | 0842807 A1 | 5/1998 | |
| FR | 703111 A | 4/1931 | |
| FR | 2718398 A1 | 10/1995 | |
| FR | 2889120 A1 | 2/2007 | |
| JP | S5735648 B2 | 7/1982 | |
| JP | S57143930 U | 9/1982 | |
| JP | S59177009 A | 10/1984 | |
| JP | S608121 A | 1/1985 | |
| JP | 60160911 U | 10/1985 | |
| JP | S616038 A | 1/1986 | |
| JP | S6275735 U | 5/1987 | |
| JP | S6328043 U | 2/1988 | |
| JP | H04189635 A | 7/1992 | |
| JP | H04115448 U | 10/1992 | |
| JP | H07205690 A | 8/1995 | |
| JP | 2001105949 A | 4/2001 | |
| JP | 2003341393 A | 12/2003 | |
| JP | 2005289187 A | 10/2005 | |
| JP | 2009154821 A | 7/2009 | |
| KR | 2019970008834 | 3/1997 | |
| KR | 20030064150 A | 7/2003 | |
| KR | 1020100049059 A | 5/2010 | |

(56) References Cited

FOREIGN PATENT DOCUMENTS

| WO | 93/25404 A1 | 12/1993 |
|---|---|---|
| WO | 94/07393 A1 | 4/1994 |
| WO | 9501888 A1 | 1/1995 |
| WO | 9720706 A1 | 6/1997 |
| WO | 2003/068557 A1 | 8/2003 |
| WO | 2012009515 A1 | 1/2012 |
| WO | 2013/167975 A2 | 11/2013 |
| WO | 2013/169714 A1 | 11/2013 |
| WO | 2013/169715 A1 | 11/2013 |
| WO | 2013/169717 A1 | 11/2013 |
| WO | 2013/169718 A1 | 11/2013 |
| WO | 2013/169719 A1 | 11/2013 |
| WO | 2013/169720 A1 | 11/2013 |

OTHER PUBLICATIONS

Search Report for Application No. PCT/US2013/039856, dated May 7, 2013.
Office Action for U.S. Appl. No. 14/398,498 dated Sep. 24, 2015.
Office Action for U.S. Appl. No. 14/398,577 dated Sep. 22, 2015.
Japanese Office Action for Japanese Patent Application No. 2015-511601, dated Jan. 6, 2016.
Office Action for U.S. Appl. No. 14/399,015 dated Feb. 16, 2016.
Office Action for U.S. Appl. No. 14/399,038 dated Mar. 1, 2016.
Office Action for U.S. Appl. No. 14/398,498 dated Jun. 8, 2016.
Office Action for U.S. Appl. No. 14/398,768 dated Jun. 9, 2016.
Office Action for U.S. Appl. No. 14/398,820 dated May 13, 2016.
Korean Office Action for application No. 1020147034455 dated Apr. 20, 2016.
Office Action for U.S. Appl. No. 14/399,015 dated Aug. 18, 2016.
Office Action for U.S. Appl. No. 14/398,498 dated Sep. 29, 2016.
Office Action for U.S. Appl. No. 14/398,768 dated Oct. 6, 2016.

\* cited by examiner

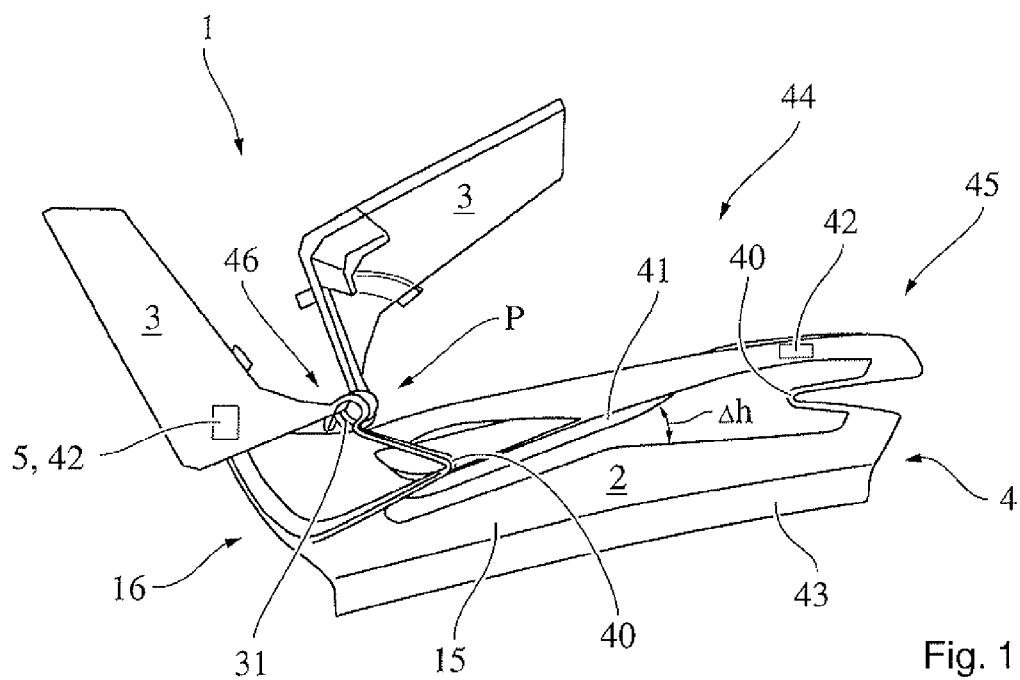
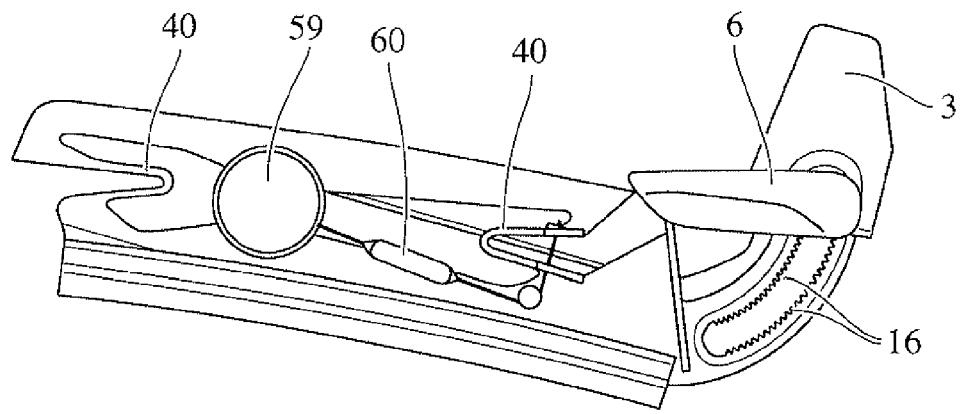
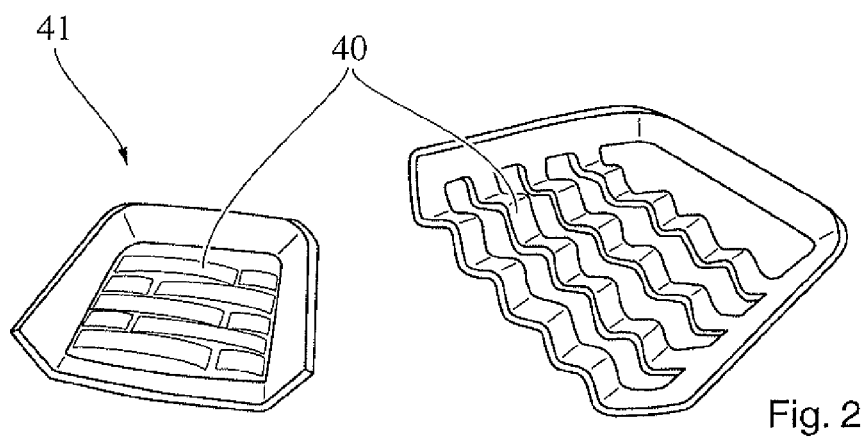
Fig. 1
Fig. 1a
Fig. 2

VEHICLE SEAT

CLAIM OF PRIORITY

This application claims priority to U.S. Application Ser. No. 61/643,587, filed May 7, 2012, the entire contents thereof are incorporated herein by reference.

FIELD

The present invention relates to a vehicle seat and comprising a seat part and a backrest, with a structure that is made in an integral manner.

BACKGROUND

Such a vehicle seat is known from DE 10 2011 106 219. In automotive engineering, there is a continuous desire to be able to produce such a vehicle seat more easily and/or cost-effectively.

It was therefore the object of the present invention to provide a vehicle seat or individual components of a vehicle seat which meet(s) the abovementioned requirements.

The object is achieved with a vehicle seat having a seat part and a backrest, wherein the supporting structure of the seat part and/or the backrest, in particular the side part thereof, integrally has at least one spring element, a pivot point and/or a safety belt connection.

SUMMARY

The present invention relates to a vehicle seat with a seat part and a backrest.

According to the present invention, the supporting structure of the seat part and/or the backrest, in particular the side part thereof integrally has at least one spring element, a part of the inclination adjuster and/or a safety belt connection.

Preferably, the seat part and/or the backrest is produced from plastics material, in particular fibre-reinforced plastics material. The seat part and/or the backrest are preferably produced by providing a fiberstructure, which is bound with a harz. As soon as the structure is stiff enough to remove it from a tool without deformation, it is preferably overmoulded with a plastic material.

In a preferred embodiment the supporting structure at least of the side part of the seat part and/or the backrest is provided in an integral manner, i.e. as one single part.

In a preferred embodiment, the seat part and/or the backrest integrally has a seat shell and/or cross member. Preferably the seat shell comprises spring elements integrally. Preferably, the seat shell is provided in a displaceable manner relative to the side part of the supporting structure of the seat part, for example by spring elements between the side part and the seat shell and/or in the side part itself.

Preferably, the height adjuster of the seat shell is integrated into the side part of the supporting structure of the seat part. More preferably the rear and/or the front region of the seat shell is adjustable in height in relation to the side part of the supporting structure of the seat part.

For example, a spring is provided in the side part of the seat part and is stretched, as a result of which the seat shell rises. Preferably, the side part has at least one wedge-shaped surface, along which an element is moved and in the process raises and lowers the cushion shell.

Preferably, the supporting structure of the seat part integrally has a cross member on which the seat shell is supported in the event of a front-end impact.

Preferably, the side part of the supporting structure of the seat part is provided integrally with the upper rail of a longitudinal seat adjuster.

Preferably, the backrest integrally has at least a part of an inclination adjuster and/or integrally has at least a part of a headrest.

It is also possible according to the invention to produce the entire vehicle seat integrally, in particular from plastics material, preferably fibre-reinforced plastics material.

Another preferred or inventive embodiment of the present invention is a vehicle seat, wherein the seat part and/or the backrest has a cushion which is filed with particles.

Due to these particles, the cushion adapts to the shape of the bottom and/or the back of the occupant. Preferably, the particles are provided in compartments, so that their movement within the cushion is restricted. The particles can be made from Styrofoam or the like.

BRIEF DESCRIPTION OF THE DRAWINGS

The inventions are explained in the following text on the basis of FIGS. 1-5.

These explanations are merely by way of example and do not limit the general concept of the invention.

In the figures:

FIGS. 1 and 1a schematically show the integral seat part.

FIG. 2 shows a seat shell with spring elements

Figure 3:
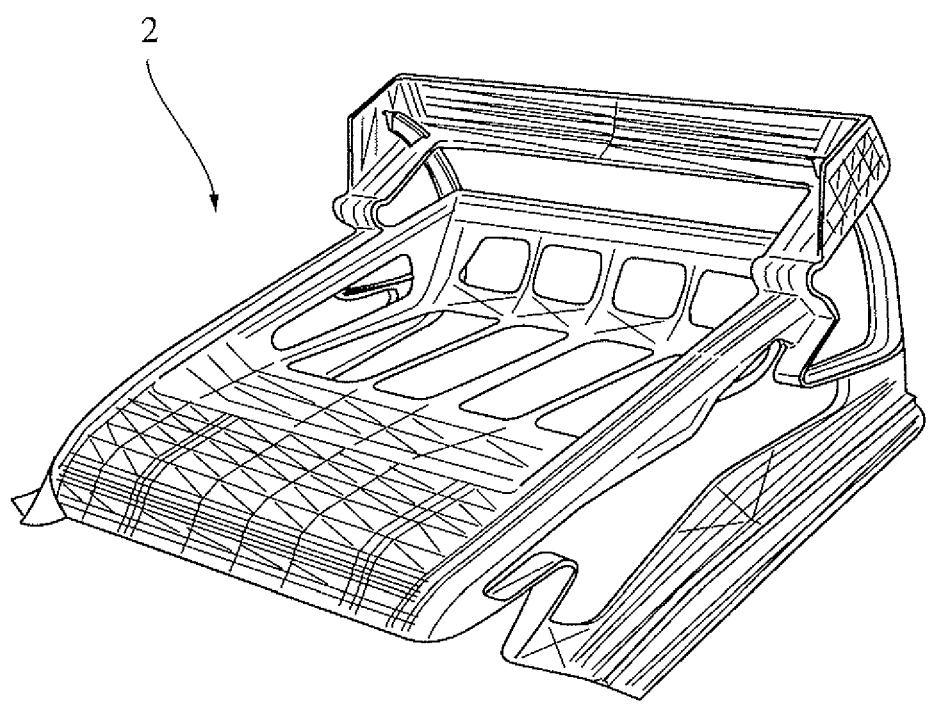
Figure 4:
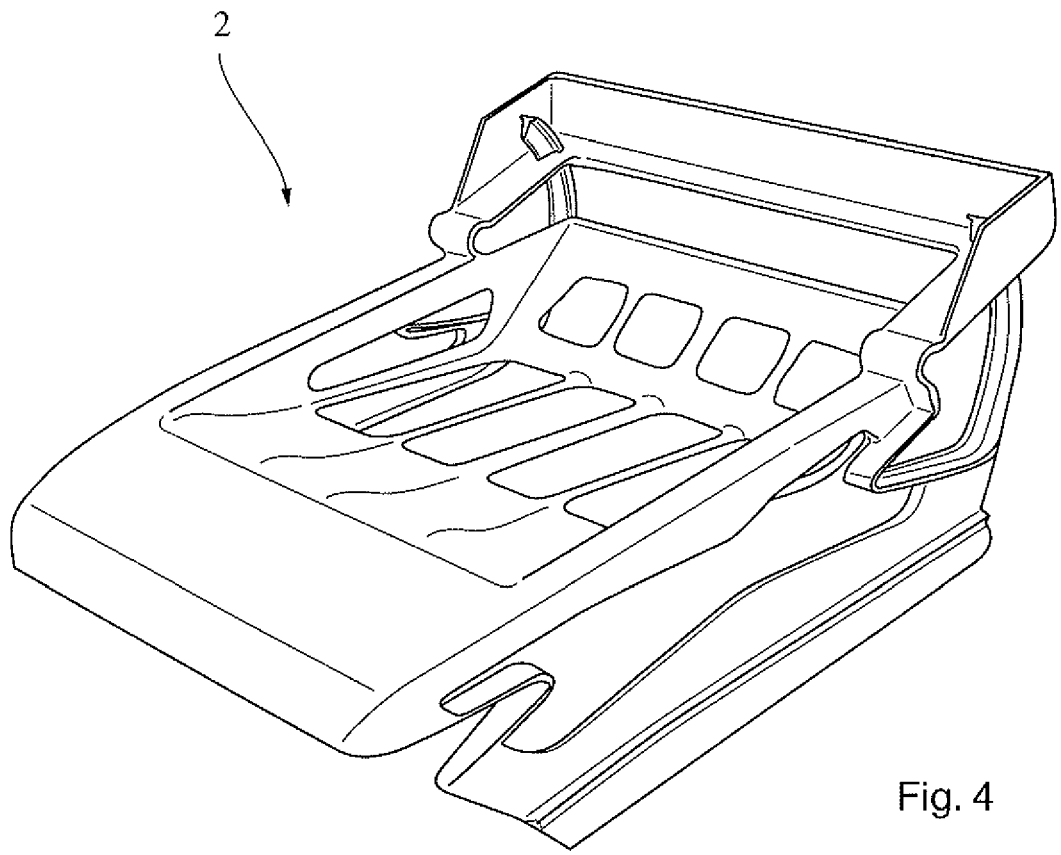
Figure 5:
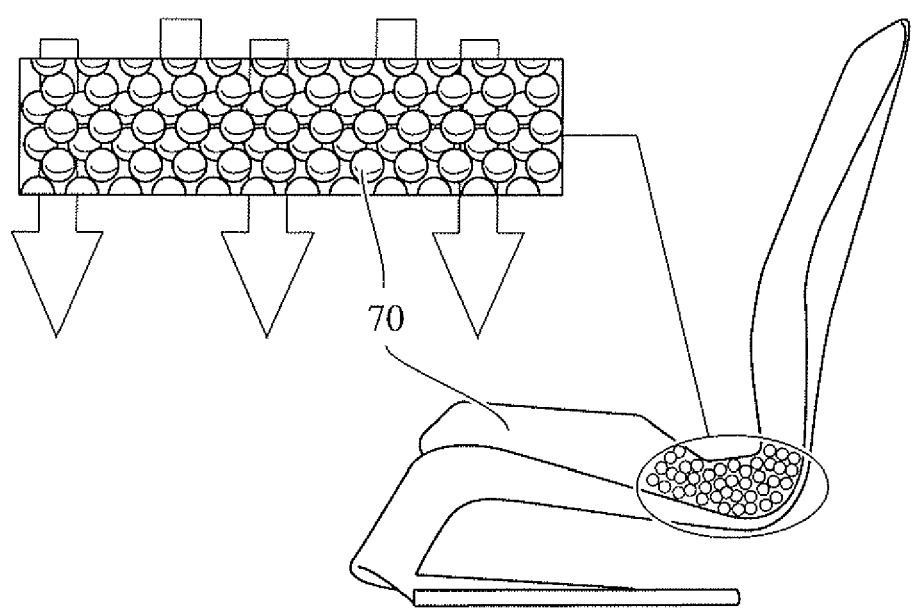

FIGS. 3 and 4 show the production of the structure of the seat part according to FIGS. 1 and 1a FIG. 5 shows a cushion with particles.

Parts that correspond to one another are provided with the same reference signs in all of the figures.

DETAILED DESCRIPTION

The present invention relates to a vehicle seat 1 with a seat part 2 and a backrest 3 which is provided at the seat part in a pivotable manner so that the backrest can be removed from its use for example into an easy entry position and/or to adjust the inclination of the backrest for comfort purposes. The seat preferably comprises a longitudinal adjuster.

In the embodiment of the vehicle seat 1 according to the invention illustrated in FIG. 1, at least the structure of the seat part 2 is configured in an integral manner, i.e. made as a single part. Preferably, the seat part 2 is configured as a plastics part, in particular as a fibre-reinforced plastics part. Arranged integrally on the side part of the seat part 2 is an upper rail 43 which belongs to the longitudinal adjuster 4. Furthermore, the side part of the seat part 2 has at least one spring element 40, by way of which the height adjustment of the seat shell 41 can be brought about, in that the distance Δh between the seat shell 41 and the upper rail 43 is changed, as a result of which the spring element 40 stretches elastically or contracts. Preferably, the two spring elements 40 have different spring characteristics, with the spring in the region of the posterior of a seat occupant particularly preferably having a harder spring characteristic than the spring in the region of the thigh rest. Furthermore, a toothing 16 is provided integrally with the side part of the seat part, said toothing 16 being part of the recliner of the vehicle seat according to the invention. Moreover, the vehicle seat according to the invention integrally has two cross members 42, which connect the two side parts, arranged on the right-hand and left-hand side, of the seat part together. Furthermore, the pivot axis for the backrest 3 is arranged integrally on the seat part 2. Moreover, the seat part preferably integrally has the pivot bearing P for the backrest. The seat part 2 is also integrally equipped with a seat shell 41 and spring element 31 which is provided between the backrest and the seat part.

FIG. 1a shows substantially the embodiment according to FIG. 1, with the adjustment of the inclination angle of the backrest 3 and the height adjustment of the seat shell being illustrated in the present case. The inclination adjuster 5 may be a discontinuous or continuous adjuster. A movement of the lever 6 can unlock for example the adjustment of the backrest, and the occupant then adjusts the inclination of the backrest with his body. Alternatively or in addition, the lever 6 can drive a gearwheel which rolls on the teeth 16 and as a result adjusts the inclination of the backrest. A person skilled in the art will understand that the adjustment can also take place in a motorized manner, in that at least one and preferably two gearwheels mesh with the toothing 16. The height is adjusted preferably via a hand wheel 59 which drives for example a cam that pushes the seat shell upwards. This adjuster is provided in the front third of the seat part 45 in order to give the seat part sufficient stability with regard to "submarining". When the height adjuster is actuated, the springs 40 are spread. The seat shell is returned into a lowered position via the springs 40. A force transmission means 60 can be coupled to the adjusting mechanism 59, said force transmission means 60 actuating the spring in the region of the posterior of the seat occupant 46 when the hand wheel is actuated, and so the spring excursion of said spring is different from the spring excursion of the front spring. As a result, the expansion of the springs 40 can be executed differently.

FIG. 2 shows the seating shell 41 with spring elements 40 which are integrally provided. This reduces the number of parts needed.

FIGS. 3 and 4 show the production of the seat part. As can be seen from FIG. 3, in a tool a fiber structure is provided, which is fixed with a harz. As soon as the harz is solidified sufficiently, so that the structure does not deform anymore, it is removed from the tool and overmoulded with a plastic layer in a second tool or in a bath.

FIG. 5 shows yet another embodiment of the present invention. Here the cushion comprises a multitude of particles between the seat structure and a cover, so that the cushion adapts to the shape of the bottom and/or back of the seat occupant.

LIST OF REFERENCE SIGNS

1 Vehicle seat
2 Seat part
3 Backrest
4 Longitudinal adjusting device
5 Inclination adjusting apparatus
6 Adjusting lever
15 Side part
16 Toothing
31 Spring means
40 Spring means, height adjuster
41 Seat shell
42 Cross member
43 Upper rail
44 Supporting structure
45 Front part of the height adjuster
46 Rear part of the height adjuster, rear part of the height adjuster of the seat shell
59 Height adjuster
60 Force transfer means, cable
70 particles
P Pivot point, pivot axis
Δh Amount of the height adjustment

The invention claimed is:

1. A vehicle seat having a seat part and a backrest, wherein:
a seat shell is provided in a displaceable manner in relation to a side part of a supporting structure of the seat part;
a height adjuster of the seat shell is integrated into the side part of the supporting structure of the seat part;
the height adjuster includes at least one spring element;
the side art of the supporting structure of the seat part integrally has the at least one spring element.

2. The vehicle seat according to claim 1, wherein the seat part and/or the backrest is produced from fiber-reinforced plastics material.

3. The vehicle seat according to claim 1, wherein at least the side part of the supporting structure of the seat part is made as a single part.

4. The vehicle seat according to claim 1, wherein the seat part integrally has the seat shell.

5. The vehicle seat according to claim 4, wherein the seat shell comprises the at least one spring elements integrally.

6. The vehicle seat according to claim 1, wherein the side part of the supporting structure of the seat part is provided integrally with an upper rail of a longitudinal adjuster.

7. The vehicle seat according to claim 1, wherein an upper rail of a longitudinal adjuster is integrally provided with the supporting structure of the vehicle seat.

8. The vehicle seat according to claim 1, wherein a rear region of the seat shell is adjustable in height in relation to the side part of the supporting structure of the seat part.

9. The vehicle seat according to claim 1, wherein the supporting structure of the seat part has a cross member on which the seat shell is supported in the event of a front-end impact.

10. The vehicle seat according to claim 1, wherein the seat part and/or the backrest has a cushion which is filled with particles.

11. The vehicle seat according to claim 10, wherein the seat part and/or the backrest is produced from fibre-reinforced plastics material.

* * * * *